March 28, 1961   G. W. COOK   2,976,736
MECHANICAL-PNEUMATICAL SUSPENSION AND REFERENCE SYSTEM
Filed Oct. 12, 1959   3 Sheets-Sheet 1
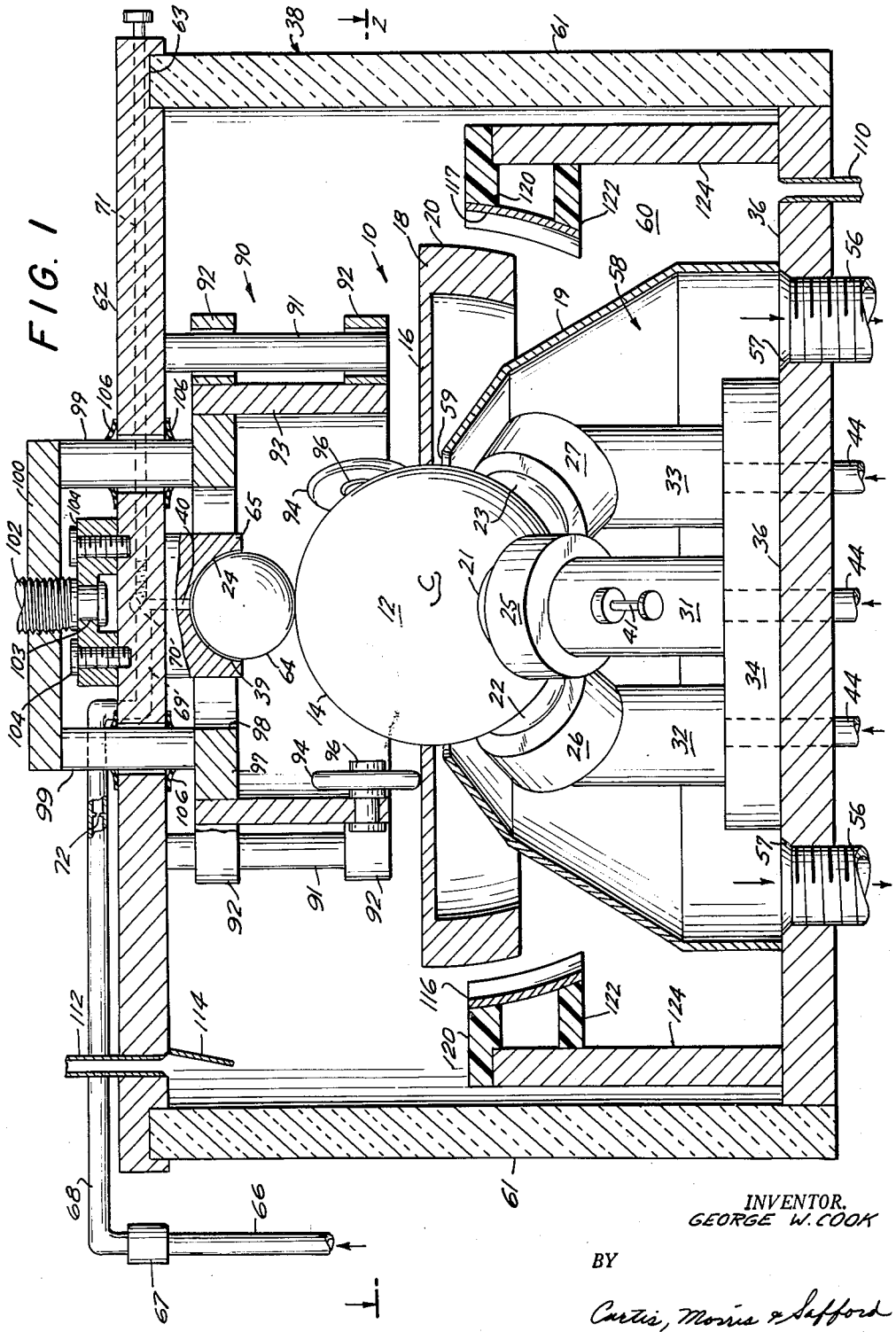
INVENTOR.
GEORGE W. COOK
BY
Curtis, Morris & Safford
ATTORNEYS

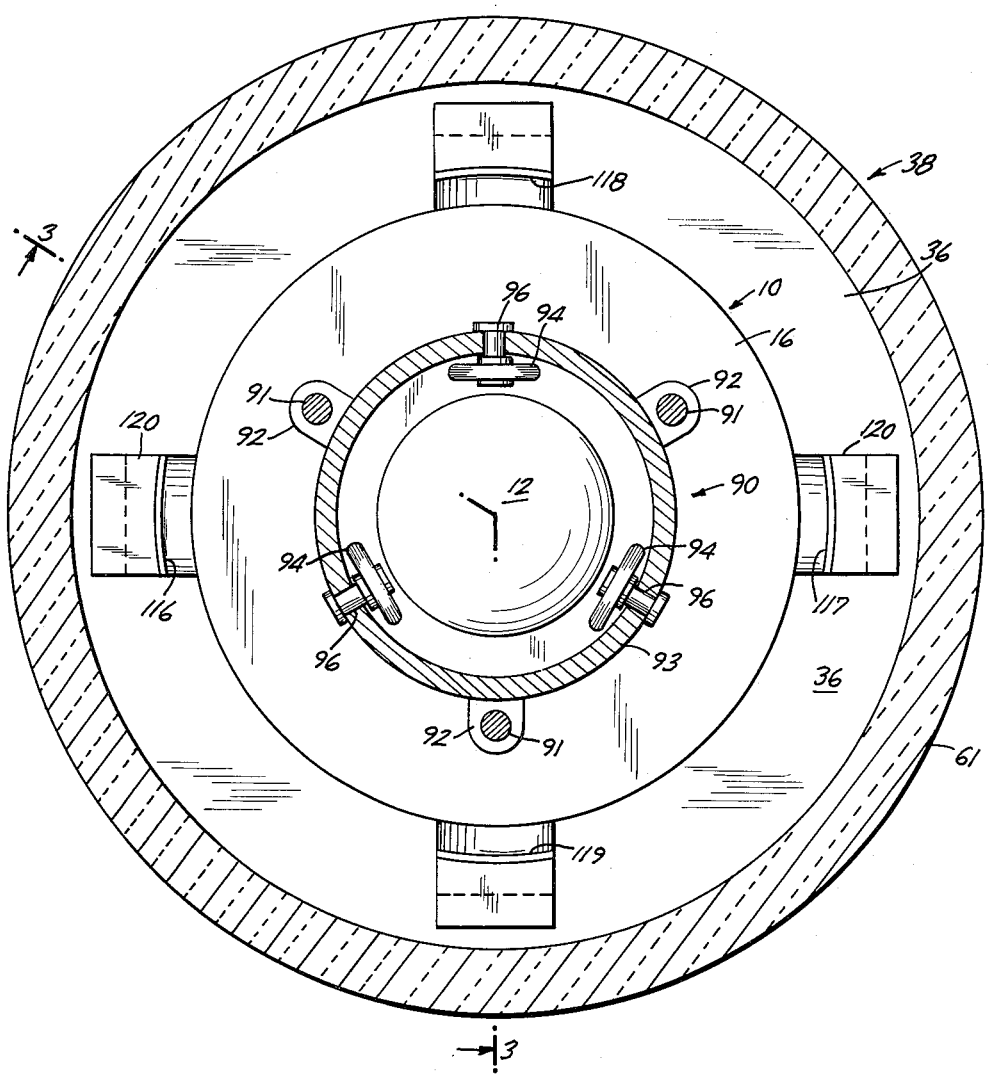

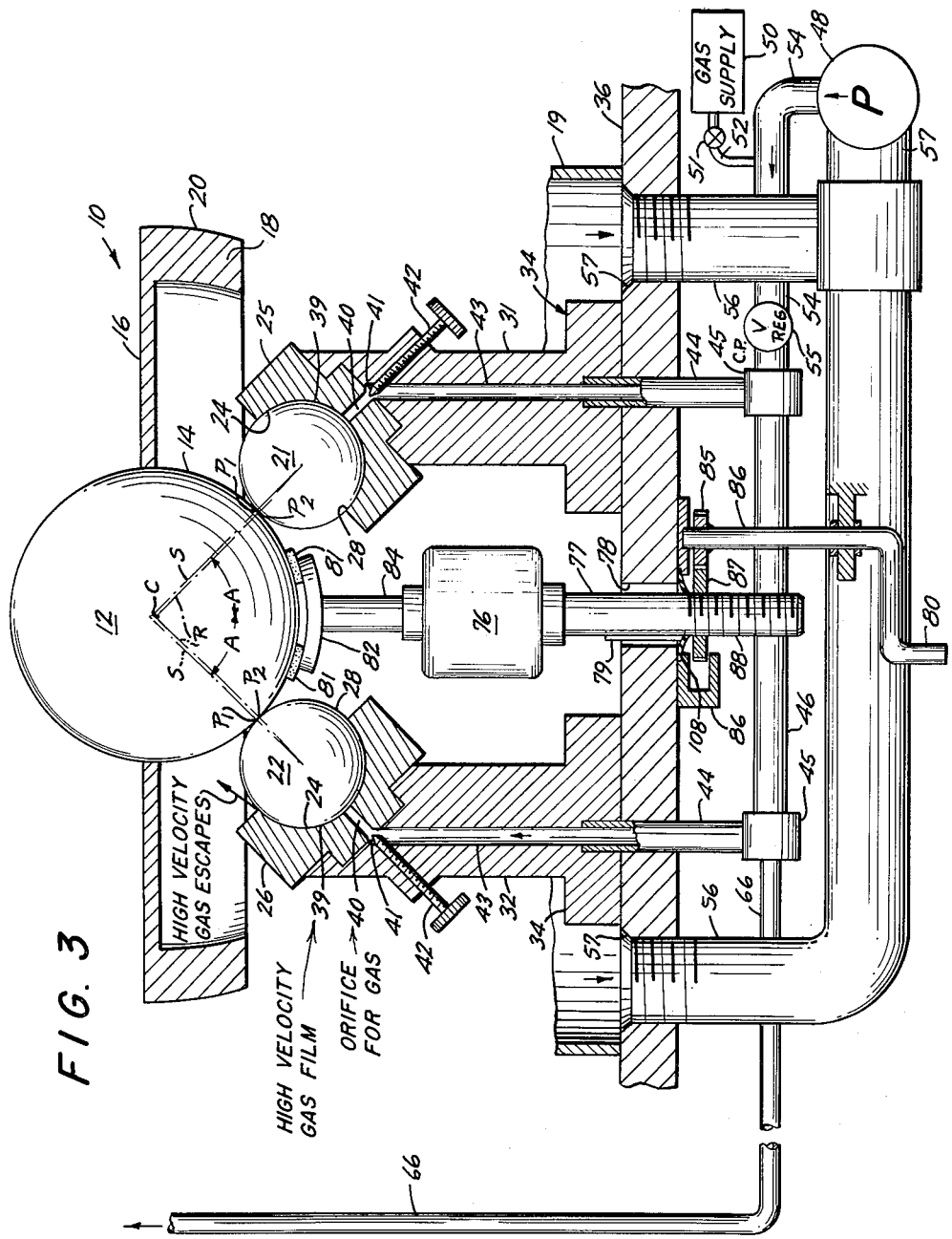

United States Patent Office 2,976,736
Patented Mar. 28, 1961

2,976,736

MECHANICAL-PNEUMATICAL SUSPENSION AND REFERENCE SYSTEM

George W. Cook, Washington, D.C., assignor to Thiokol Chemical Corporation, Bristol, Pa., a corporation of Delaware Filed Oct. 12, 1959, Ser. No. 845,883

20 Claims. (Cl. 74—5.6)

The present invention relates to a mechanical-pneumatical suspension and reference system wherein the dead weight of a symmetrically shaped member is supported in a manner such that during operation no appreciable torque can be transmitted between the supporting structure and the supported member. This member is supported by a plurality of spherical bodies or balls, such as precision-made ball bearings, each mounted in a socket which closely conforms to the surface of the supporting balls, and each ball is borne up in its socket by a thin, rapidly moving film of gas which escapes from the socket around the ball. The supported member has a surface in rolling engagement with these supporting balls. Each ball is free to rotate in any direction about any axis passing through its center, except that the rotational motions of the individual balls are interrelated with the movement of the supported member by virtue of the rolling engagement therebetween.

Among the many advantages provided by the present invention are those resulting from the fact that a virtually frictionless supporting bearing action is produced. The thin film of rapidly moving gas in the socket behind each supporting ball is a source of energy. As each ball is rotated, the motion of its surface interacts with this rapidly moving escaping gas film in such a way that energy is continually taken from the gas film. The net resultant forces which are imposed by the gas film on each ball always tend to continue the rotation of the ball in the direction in which it was started. Thus, a desirable regenerative drive is provided, and regardless of the direction in which the ball is initially rotated, it tends to continue being driven in its initial direction by the drive of the high velocity escaping gas film.

In the reference systems which are described herein as illustrative examples of the present invention the supported member includes a central hub portion having a surface defining part of a sphere, with a heavy rimmed disc or flywheel secured to this central spherical hub. In operation, this rotating supported member is initially driven by applied torque from a motor up to a high rotational speed, for example, 5,000 to 10,000 revolutions per minute, and then the supported member is allowed to continue rotating while being driven only by the regenerative driving action of the escaping gas films acting upon the supporting balls. The supported member gradually slows down because of air drag on the flywheel and hub, until the supported member finally reaches a speed at which the regenerative driving action of the gas films just balances the air drag. If the system is precisely and carefully made, then it usually takes several hours for the suspension system to reach the equilibrium speed.

In the illustrative examples of the present invention, the suspension system is placed in a suitable housing. The gas pressure in the housing is maintained continuously at a level considerably below atmospheric pressure. Thus, the drag of the gas atmosphere within the housing is reduced, and the rotating member continues to turn at high speed for a day or more.

In one embodiment of the present invention a true gyroscopic reference system is provided without the use of conventional gimbals. The rotating supported member behaves as though it were a gyro mounted in frictionless gimbals, with complete rotational freedom. It has limited angular boundaries in all planes excepting rotation about its spin axis.

In another embodiment of the present invention, a circular pendulum action is provided by constructing the supported member with its center of distributed mass below the center of its central spherical hub portion. Moreover, by locating the center of mass just barely below the center of the spherical hub portion, a balance between rotational spin speed and the displacement of the center of mass is advantageously provided so that for many minutes the device behaves as a "Shuler tuned" pendulum. That is, it has a natural oscillation period of 84.7 minutes, and thus it tends to maintain its spin axis pointing toward the center of the earth. Consequently the system provides a true vertical and a true horizontal reference. When the gas pressure in the housing is reduced substantially below atmospheric, then the device acts as a "Shuler tuned" pendulum for long periods of time.

In another embodiment of this invention, the center of distributed mass is positioned above the center of the spherical hub, and the device acts as a "top" with a fixed pivot point. By locating the center of mass just barely above the center of the spherical hub portion, then a balance is again provided between the rotational spin speed and the displacement of the center of mass so that the "top" behaves in a manner analogous to a "Shuler tuned" pendulum and tends to maintain its spin axis pointing toward the center of the earth.

In this specification and in the accompanying drawings, are described and shown embodiments of the suspension and reference systems embodying the invention and various modifications thereof are indicated, but it is to be understood that these are not intended to be exhaustive nor limiting of the invention, but on the contrary are given for purposes of illustration in order that others skilled in the art may fully understand the invention and the manner of applying the suspension and reference systems in practical use so that they may modify and adapt the invention in various forms, each as may be best suited to the conditions of a particular use.

The various objects, aspects, and advantages of the present invention will be more fully understood from a consideration of the following specification in conjunction with the accompanying drawings, in which:

Figure 1 is an elevational view of a mechanical-pneumatical suspension and reference system embodying the present system, with portions thereof shown in section;

Figure 2 is a cross sectional view of the device of Figure 1, being taken along the line 2—2 in Figure 1 looking downwardly; and Figure 3 is a vertical sectional view, being taken generally along the sector line 3—3 of Figure 2 passing through the vertical axis of the system.

As shown in the drawings, there is a rotatable supported member, generally indicated at 10, and including a central hub portion 12 having a spherical surface 14. In this example, the hub portion 12 is formed by a large diameter precision-made steel ball bearing having its spherical center at point C. Secured to this ball hub 12 is a heavy flywheel including an annular disc 16 and a heavy rim 18. For convenience in sensing the movements of the rotating member 10, the peripheral surface 20 of the rim is shaped as a segment of a sphere, and this spherical rim surface 20 is centered exactly at the center C. This rim surface 20 may have other shapes, but the spherical surface concentric about C is preferable for it enables capacitative sensing of the angular position of the spinnning disc, as will be explained further below.

In order to support the rotating member 10 with a virtually frictionless and regenerative gas film driving action, a plurality of spherical supporting bodies 21, 22 and 23 are in rolling engagement with the spherical surface 14 and are mounted in the precision sockets 24 of the respective cups 25, 26, and 27. These spherical bodies are shown as being precision-made steel ball bearings of substantial size, preferably having a size with a diameter lying in the range from 0.5 of an inch to 1.6 of an inch. The size of these supporting balls is determined by the desired size and weight of the rotating member 10, the size of its hub 12, by the angle of the sockets and pressure of the gas which is used to provide the high velocity gas films in the sockets 24, and by the average size of the molecules in this gas, for reasons as explained in detail near the end of the specification. An optimum size for these supporting balls is approximately one inch in diameter when made of steel and used in a system of the type shown. The hub sphere 12 is shown as being substantially larger than the supporting balls because this larger size is desirable in this embodiment to provide clearance between the rims of the cups and the underside of the disc 16 and an inner shield housing 19 so as to allow room for the flywheel to tilt when its operation requires. As shown the hub sphere 12 is a steel ball bearing having a 2.5 inch diameter and the system is arranged to permit 15° of tilt. Other diameters for the sphere hub 12 may be used, subject to the limiting relationships set forth near the end of the specification.

The sockets 24 just precisely fit the surface of the respective balls 21, 22, or 23 therein when the gas is turned off and the ball is allowed to drop down into contact with the socket surface 24. The depth of the socket 24 is just slightly less than the radius of the ball. The difference between the radius of one of these supporting balls and its socket is preferably between 10% and 20%, which is between 0.05 of an inch and 0.10 of an inch in the case of one inch diameter balls as shown. This difference should be as small as is practically possible, keeping in mind the fact that the socket has the same size as the ball and thus the lip 28 of the socket becomes progressively closer to the ball as the depth of the socket approaches the radius of the ball. Below 10% in this difference the lip of the socket introduces undesirable lateral restraint on the ball. When the difference is increased much above 20% the gas is allowed to escape too readily from the socket, and supporting and regenerative driving effort are reduced.

A satisfactory way in which to make these precision sockets is to use cups 25, 26, and 27 of material which is softer than these supporting balls, for example aluminum, and to cut out the sockets 24 slightly under-size. Then the hard balls 25, 26, and 27 are forcibly pressed into the sockets so as to cold forge them into precise conformance with the ball.

For proper operation, the lip 28 of the socket should be sharp all around the ball, and should not be rounded or chamfered at any point. The theory which is convenient to explain this factor is that the sharp lip 28 apparently causes the high speed gas film to escape from each socket 24 in a stable conical pattern tangent with the surface of the ball near the sharp lip. When the lip 28 is not sharp, then the high speed gas film apparently burbles or swirls erratically adjacent to the ball as the gas escapes from the socket, and thus prevents stable operation. However, regardless of whether this particular theory is accurate, a proper stable regenerative driving action is not obtained if any substantial rounding or chamfering of the lip 28 is present.

The cups 25, 26 and 27 are mounted on hollow pedestals 31, 32 and 33, respectively, which are spaced uniformly 120° apart around the vertical axis of symmetry passing through the center point C. These three pedestals are secured to an annular base 34 mounted upon a circular bottom plate 36 of the housing 38.

In order to create a high velocity film of gas 39 all around the inner surface of each of the respective cups 25, 26, and 27, they each have a small diameter passage 40 which is centrally located with respect to the socket 24 and extends perpendicular to the plane of the lip 28. A pressure-reducing needle valve 41 controls the pressure of the gas passing through the orifice passage 40 by restricting the flow from a supply passage 43 extending up through the respective pedestals. These supply passages are fed through pipes 44 extending up through the base plate 36 and connected by fittings 45 to a supply main 46.

A convenient source of the gas is provided, for example shown here schematically as a pump 48 and a make-up gas supply tank 50 with a shut off valve 51 and a pipe 52 connected into the output line 54 from the pump. The valve 51 is normally cracked open by an amount sufficient to replace in the system any gas which leaks out during operation.

It is found that any gas containing any significant amount of a chemically active constituent, such as oxygen, will have an accelerated corrosive action upon the sockets 24 and upon the balls 21, 22, and 23; the corrosion is apparently accelerated by the high velocity film scouring action. This rapid corrosive action will roughen the sockets and will attack the balls, causing a build-up of aluminum oxide coatings, or the like, which will impede and soon prevent proper operation. Accordingly, the gas used should be substantially inert with respect to the moving parts. Moreover, this inert gas should be of a type which will not tend to freeze itself solid at room temperature due to rapid expansion and cooling as it escapes past the lip 28. If this freezing should occur, then the gas can be pre-heated by electrical resistance heaters associated with the passages 43.

An inert gas having a larger molecular size is preferred, such as diatomic or polyatomic gases or large molecular weight gases, because the smaller monatomic molecules do not create a gas film 39 of adequate thickness unless the pressure in the orifice 40 is increased to a value which is usually too high for satisfactory operation. For example, under otherwise identical operating conditions, helium which is a monoatomic gas of low viscosity requires an operating pressure in excess of 50 p.s.i. in the orifice passage 40, whereas nitrogen, which is a diatomic gas, operates satisfactorily at 5 p.s.i. Suitable inert gases are nitrogen, carbon monoxide, carbon dioxide (if heated to prevent freezing), krypton, and xenon. Nitrogen has been found to be quite satisfactory, and it is nitrogen which is here being supplied from the tank 50.

A pressure-regulating vave 55, which is connected to the pump output line 54, produces a constant high pressure in the supply main 46, for example, 100 to 200 p.s.i., and the respective valve stems 42 of each of the pressure-reducing needle valves are set to produce a much lower pressure in the orifice passage 40. In this example, the pressure in the orifice passage 40 is in the range from 4 to 12 p.s.i. above the pressure of the gas in the atmosphere surrounding the exposed upper surfaces of the respective balls 21, 22, and 23.

A reduced pressure is provided within the inner shield housing 19 by means of several suction ducts 56 which are secured into outlet ports 57 in the bottom plate 36 positioned at intervals around the annular base 34. These suction ducts 56 are connected to the intake 57 of the pump 48.

It will be noted that some of the high velocity gas escaping from the cups 25, 26, and 27 would tend to strike the underside of the disc 16 and might influence its motion, but this is prevented by the shield housing 19. Another advantage of this shield 19 is that it prevents any substantial loss of gas from its interior 58 by virtue of the fact that the total quantity of gas in the interior 58 is held substantially constant. The gas is sucked out through the ports 57 as fast as it is replaced by that escaping from the sockets. Thus, there is very little net flow through the annular space 59 (Figure 1) around the spherical hub 12 when the pressure within the region 60 is the same as in the region 58.

The housing surrounding the chamber 60 includes a heavy cylindrical glass wall 61 secured to the bottom plate 36. The housing has a circular metal cover plate 62 with an annular groove 63 interfitting with the upper edge of the glass wall 61. This cover plate can be released and removed so as to reach the moving parts if desired.

In order to prevent sudden vertical movements of the mechanism from bouncing the hub ball 12 out of the nest provided by the three supporting balls, a fourth guide ball 64 fits up into a socket 24 in an upper cup 65 and rests on the top of the hub ball 12. The high-velocity gas film 39 is created by gas which is fed from the supply main 46 through an outside line 66 having a releasable coupling 67 and continuing through an upper line 68 which is connected to a passage 69 in the top plate. A needle valve mechanism 70, having a long control needle 71 extending to the edge of the top plate, 62, controls the flow from the passage 69 down into the orifice passage 40. For purposes of preventing any tendency for vertical oscillation of the ball 64, a surge-damping orifice 72 is placed in the upper line 68 near the needle valve 70.

*Placing the system in operation*

For placing the system in operation, the rotating member 10 is accelerated up to the desired operating speed by means of an electric motor 76 which is mounted on an elevator shaft 77 passing through a hole 78 in the base plate. This shaft 77 has a key 79 engaging a keyway in the hole 78 so as to prevent turning. The operator uses a crank 80 to elevate the motor until three small felt pads 81 frictionally engage the bottom of the sphere hub 12. These three felt pads are spaced symmetrically 120° apart about the vertical axis and are glued to the concave face of a spherical saddle 82. The saddle is secured to the top end of a motor shaft 84.

In order to raise or lower the elevator shaft 77, there is a spur gear 85 affixed to the rotatable shaft 86 of the crank 80, and this gear meshes with a jackscrew gear 87 which has its vertical movement restrained by a U-shaped guide 88. The jackscrew gear 87 engages the threaded lower end 88 of the elevator shaft 77 and raises or lowers the motor 76, depending on which way the crank is turned. The speed of the motor 76 is suitably accelerated by gradually increasing the electrical power supplied thereto, as will be understood, so as to accelerate the rotatable member 10 up to the desired angular velocity. After full speed is reached, then the motor is lowered to disengage the pads 81 from the hub 12, and the motor is then turned off.

For purposes of initially guiding the rotatable member 10 so as to assure that it is rotating in the desired plane, a guide mechanism 90 is used. This guide mechanism includes three fixed vertical rods 91 projecting down from the top plate 62, each of which is slidingly engaged by a pair of slides 92 mounted on a vertically movable guide ring 93. When this guide ring is lowered, three equally-spaced rubber-rimmed wheels 94 which are mounted on stub axles 96 secured to the ring 93 touch the top surface of the annular disc 16 so as to hold the rotatable member steady.

In order to raise and lower the guide ring 93, it has an internal flange 97 with a large clearance hole 98 encircling the upper cup 65, and a plurality of elevator rods 99 extend up from this flange 97 through holes in the top plate 92. The upper ends of these elevator rods 99 are secured to a disc 100 which is moved up and down by a jack screw 102 having suitable control means, such as a hand wheel or crank on its upper end, as will be understood. The lower end 103 of the jack screw is reduced in diameter and journaled in a bearing block 104 secured by screws 105 to the top plate 62.

To prevent gas from leaking in or out of the housing 38, the elevator rods 99 are engaged by flexible sealing gaskets 106, and the elevator rod 77 is similarly engaged by a seal 108.

A suitable motor for use as the starting motor 76 is a high-speed grinder motor having a normal running speed of about 18,000 r.p.m. A voltage reducer is then used to reduce the power input to the motor so as to provide the desired slow rate of acceleration. After the rotating member 10 has reached a speed of at least 1,000 r.p.m., the guide mechanism 90 is elevated, for the rotating member is then rotationally stabilized. The acceleration is continued until the rotating member has reached a spin speed in the range from 4,000 to 10,000 r.p.m. The particular maximum speed actually used depends upon the desired type of reference system, e.g., gyroscopic or "Shuler tuned" pendulum or top, and depends upon the diameter and strength of the disc 16 and its rim 18, as discussed further below.

*Torqueless suspension*

In normal operation, the inert gas rushes out radially in all directions from the end of the orifice passage 40 and creates a high-velocity thin film 39, with the gas rapidly escaping in a thin, conical, knife-like sheet extending around the perimeter of the lip 28. The sharpness of the conical sheet of escaping gas can be felt by extending a finger into a position to intercept the flow, shown in Figure 3 by an arrowhead indicating the escape of the high-velocity gas. The gas film 39 exerts an upward force on the ball in the socket.

For purposes of explanation, consideration will first be given to a single ball and the axis of its socket will be considered as being positioned virtually so that the lip 28 lies in a horizontal plane. Then the ball "floats" in the socket with just a minute spacing between itself and the surface of the socket. The ball can be rotated in any direction by rubbing it with the palm of the hand, and the regenerative action of the high-velocity gas film continues to drive the ball in the direction in which it was initially turned. The rotation will accelerate until the regenerative gas drive is exactly balanced by the drag of atmospheric gas on the exposed upper half of the ball.

The gas does not blow the ball out of the socket, for, in accordance with Bernoulli's principle, the gas escapes at high velocity all around the inner surface of the cup, and the effective pressure drops sharply in the gas film 39 as it spreads out from the mouth of the orifice passage 40. A single ball remains centrally located in an upright cup, for any tendency for the ball to move laterally would tend to increase the spacing and hence increase the escape velocity on one side while restricting the spacing and lowering the escape velocity on the other side. Immediately a central-position-restoring force is imposed on the ball because the increasing escape velocity on the first side causes a reduction in pressure there, and vice versa.

The regenerative drive of the high-velocity film, which tends to continue rotation of a ball in any direction once it has begun, is produced by the differences in relative velocities between the surface of the ball and the escaping gas. Near the lip of the cup in the region in which the surface of the ball is entering the socket, the surface of the ball moves counter to the escaping gas flow and thus tends to inhibit the escape of the gas, thereby retarding its escape and raising the localized pressure in the gas film. On the exit side of the socket, the surface of the ball is moving in the same direction as the escaping gas and thus aids in the escape, thereby increasing the gas velocity and reducing the localized pressure. As a result of the fact that the gas velocity is higher on the exit side of the socket, this faster gas flow exerts a larger tangential force on the surface of the ball and thus drives the ball in the direction of its existing rotation.

It will also be appreciated from this analysis that the balls becomes displaced laterally slightly from the center of the socket toward the exit side of the socket because the pressure is reduced in the exit region where the gas velocity is being increased. Consequently, the gas film is thinner on the exit side.

As the speed of rotation is increased, the gas film becomes progressively thinner on the exit side of the socket. For this reason, it is important that the surfaces of the ball and socket be precisely made; any high spots on the ball or in the socket would touch through this very thin gas film. For proper operation, there should be no contact between the surfaces of the ball and its socket, in the range of the operating speed. In actual practice, it is found that even the very most minute acceleration of the ball in any direction will cause the regenerative gas film drive to come into play so as to continue the rotation and so as to continue the acceleration until the equilibrium speed is reached, as determined by the drag of atmospheric gas on the exposed surface of the ball.

The foregoing discussion assumed that the socket was in an upright or substantially upright position. When the socket is inclined on its pedestal at an angle "A" of approximately 45°, as shown in Figure 3, then a single ball would tend to lie on the lower side of the socket, and the characteristics described above would disappear; however, a plurality of balls and sockets are used. The respective sockets are each inclined inwardly at an angle "A" with respect to the vertical, and a rotatable member 10 rests down upon the balls.

When the rotatable member lightly touches the respective supporting balls, then the initial points of tangency are at the points $P_1$ which are exactly on the axes S of the respective sockets. As the dead weight of the rotatable member is applied, the balls are pushed slightly farther down into their sockets, and the pressure of the gas films 39 goes up. Simultaneously, the point of tangency on each ball is slightly lowered to the point $P_2$ below the axis of the socket, and this applies a component of force to each ball which is upwardly away from the low side of the socket. Thus, advantageously, each ball is lifted away from contact with its socket and now floats on the gas film. As the rotatable member 10 spins, it rolls on the respective support balls. The high velocity gas films provide a regenerative drive to the balls so as to continue the rotation of the rotatable member in any direction in which it is started.

The preferred angle of inclination A for the axes of the respective sockets lies in the range from 40° to 48°. When angles of less than 40° are used, then the lateral support effort provided for the rotating member is lessened. Angles above this range cause an undue geometric multiplication of the effective dead weight force of the supported member, for the spherical hub 12 tends to wedge itself down between the balls, and so the balls tend to be pushed down too far into their sockets. A larger angle can be used, but this will require a higher gas film pressure.

A suspension is thus provided, wherein no appreciable torque can be transmitted from the supporting structure 31, 32, 33, 34, 36 and 65 to the supported member 10. The suspension behaves as a frictionless bearing, because rotation in any direction tends to continue as long as the gas films are maintained.

It is an advantage of this suspension that it has an enormous overload, or shock load, capacity. If a sudden force is applied to the base plate 36 in any direction, then the inertia of the supported member 10 will tend to drive one or more of the balls 21, 22, 23, or 64 farther into its respective socket. This movement immediately restricts the escape of the gas from the socket or sockets into which the ball is depressed. At once, the film pressure jumps up toward the high pressure on the supply side of the reduction valve. This very high pressure stops the depression of the ball and prevents it from coming into contact with its socket. This high pressure is many, many times greater than the normal operating pressure in the gas film. Accordingly, the overload capacity of the suspension is many, many times greater than the dead weight of the supported member 10.

*Suitable construction for rotating supported member 10*

The rotating member 10 preferably should have as low a magnetic permeability as possible and as little magnetization as possible, so as to avoid interaction with the earth's magnetic field. Moreover, the rotating member 10 should have a high effective resistivity so as to suppress the generation of any eddy currents therein due to local variations in the magnetic field in which the member is rotating. A precision-made ball is used, and as a practical matter it is steel. However, it is preferred to have it alloyed to reduce its permeability and residual magnetization and to increase its specific resistivity. A suitable non-magnetic material for the disc 16 and rim 18, for example, is hard brass or bronze with alloys to increase the specific resistivity.

Because of centrifugal force, there is tensile stress in the disc 16 and a large "hoop" tensile stress in the rim. This should be calculated, and the maximum speed must be held below the strength limit. Using brass or bronze materials, the largest practical size for the rim 18 is about 10 inches in diameter, for the centrifugal force at any given speed increases with diameter. In this example, the diameter of the rim 18 is 6 inches.

Care should be taken that the disc 16 and rim 18 are precisely made and stress relieved so as to prevent warping thereof due to internal stresses after the final shape is reached. The disc 16 engages the sphere hub 12 just above its center and is secured thereto by a force fit.

*Helium atmosphere system*

In order to reduce the atmospheric drag upon the rotating member 10, a helium atmosphere is advantageous within the chamber 60 which surrounds the shield 19 and is within the housing 38. Helium has low molecular weight and low viscosity, as mentioned above, and so it does not exert much drag on the rotating member.

By virtue of the fact that the inert gas, e.g., nitrogen, which is used in the inner chamber 58 is pumped out as fast as it enters, the amount of gas therein remains constant. Thus, there is substantially no net flow through the space 59, even through there is a large clearance. Consequently, there is substantially no intermixing of the heavier inert, supporting-driving gas with the helium drag-reducing gas. The pressures in the chambers 58 and 60 are held equal.

If any small amount of the heavier inert gas should pass through the space 59 into the outer chamber 60, it immediately sinks down toward the bottom plate 36, because of its greater density than helium. Thus, the inert gas does not come into contact with the flywheel. Any inert gas in the bottom of the outer chamber 60 can be withdrawn through the gas drain tube 110 and is replaced by helium which is introduced slowly through an upper tube 112 having a baffle 114 so as to prevent any influence of the entering gas upon the member 10.

To prevent mixing of the gases, it is important to maintain the same pressures in both chambers 58 and 60. Accordingly, both of these may conveniently be at normal atmospheric pressure, for the helium markedly reduces the frictional drag on the flywheel as compared to air itself.

Low pressure system

For further reducing the gas drag on the rotating member 10, the pressure in the chamber 60 and also in the chamber 58 is reduced considerably below normal atmospheric pressure by connecting a vacuum pump to the line 110. If desired, a low-pressure helium atmosphere can be maintained in the outer chamber 60.

Gyroscopic reference system

A gyroscopic reference system is provided by positioning the center of distributed mass of the rotating member 10 at the center C of the spherical hub 12. In order to sense the angular position of the axis of rotation of the rotating member 10, suitable sensing means are provided, for example, such as an optical measurement using the reflection of light beams from the disc 16 or a capacitance measurement using position sensing capacitor plates. In this example, capacitance sensing is shown and provides advantages in use, for the capacitance variations are a linear function of the angle of inclination of the spin axis by virtue of the structural arrangement shown. Four sensing electrodes—116, 117, 118, and 119—are provided, spaced 90° apart around the rim 18. These electrodes are all identical and are supported by insulating brackets 120 and 122 on posts 124. Each electrode has a concave face which is a portion of a segment of a sphere exactly concentric about the center C. It is important that these capacitance electrodes 116, 117, 118, and 119 be spherically shaped and that they have a radius of curvature in a spherical surface just outside of the spherically shaped surface 20 of the spinning disc.

The diametrically opposite electrodes 116 and 117 form a first sensing pair, and the other diametrically opposite electrodes 118 and 119 form a second sensing pair. It will be noted that the lower edge of the rim 18 is directly opposite the center of each of the electrodes when the axis of spin is aligned with the axis of the support structure.

Whenever the spin axis becomes tipped away from the axis of the supporting structure, then the rim surface 20 overlaps a greater proportion of the area of one electrode of one or both of the pairs 116—117 and 118—119 and overlaps a lesser proportion of the area of the other electrode of one or both of these pairs. As a result, the capacitance between the rim and these electrodes differentially varies. By virtue of the arrangement shown, the differential capacitance change is a linear function of the change in angle of the spin axis, throughout the operating range. A suitable capacitance difference sensing circuit is connected to each of the pairs of electrodes 116—117 and 118—119, for example, frequency-shift or frequency-modulated oscillator circuits can be used to measure the angle of the spin axis. A measurement system which can be used to advantage for the purpose is shown in my copending application Serial No. 844,993, filed October 7, 1959.

Shuler tuned pendulum reference system

In order to provide a pendulum reference system which always indicates true vertical and horizontal with respect to the center of the earth, the position of the center of the distributed mass of the rotating member 10 is located just slightly beneath the center C. A balance is obtained between a predetermined rotational spin speed, for example, such as 5,000 r.p.m., and the displacement of the center of mass such that the rotating member 10 has a natural oscillation period of 84.7 minutes, and thus it tends to maintain its axis always pointing toward the center of the earth in spite of movements of the base plate 36.

It is to be understood that the natural oscillation period is a function of both the displacement of the center of mass and the actual rotational spin speed. Accordingly, the virtually frictionless suspension system of the present invention is advantageous in enabling the rotating member to "coast" for long periods of time at very nearly constant speeds. Thus, the natural period of oscillation is held very nearly equal to the required period of 84.7 minutes.

When a different displacement of the center of mass is used, then the predetermined rotational spin speed required to provide an 84.7 minute period becomes different. The closer that the center of distributed mass is to the center C, then the slower is the required speed to provide this 84.7 minute period. It is found advantageous to use a Shuler tuned rotational spin speed in the optimum range from 4,000 to 6,000 r.p.m.

Shuler tuned top reference system

For providing a rotating "top" reference system which always indicates true vertical and horizontal, the center of the distributed mass is positioned just above the center C. As before, the closer this center of mass is to the center C, the slower the required speed for providing an 84.7 minute period. As in the case of the pendulum, the optimum range of spin speed for a system as shown is 4,000 to 6,000 r.p.m.

Further operating relationships and characteristics

In addition to the relationships discussed above, it is noted that increasing the size of the supporting balls enables the system to support an over-all heavier deadweight. However, there is an upper limit, as expressed in the range specified, because the dead-weight of the load being supported includes the weight of the supporting balls, and their weight increases as the cube, whereas their surface area only increases as the square of the diameter.

As described above, the gas films are thinner on the exit side of each socket, and become progressively thinner with increasing rotational speed. Thus, there is a limit imposed on the maximum ratio of the radius R of the hub sphere 12 to the radius of the supporting balls. Otherwise, the supporting balls must rotate so fast that the gas film becomes too thin for practical precision tolerances in the socket and ball, and contact occurs. The rotational speed of the supporting balls D is related to the rotational speed E of the member 10 by the following expression, where "$r$" is the radius of the supporting balls:

$$(1) \qquad \frac{D}{E} = \frac{R \sin A}{r}$$

Accordingly, it is found that the diameter of the hub sphere has a preferred range of size less than five times the diameter of the supporting balls. Moreover, with change in attitude of the base plate 36, there should be as little gyroscopic action as possible caused by the rotating supporting balls. Whatever moment of inertia may be present in these supporting balls, assuming that there is no slippage and assuming that the base plate 36 is tilted, is reflected into the operation of the rotatable member 10 as though the supporting balls were at the center of the hub sphere 12. The reflected moment of inertia goes up as the square of the ratio of D to E, and this reflected mass relationship also imposes an upper limit on the enlargement of the hub sphere with respect to the supporting balls.

Reference systems with six supporting balls

In the suspension as shown in Figure 1 a single ball 64 is positioned in opposition to the three supporting balls 21, 22, and 23. In order to provide additional support for the rotating member 10, the guide ring 93 is enlarged, and the single ball 64 and its cup 65 is replaced with three supporting cups and three supporting balls in an arrangement identical to the three supporting balls 21, 22, and 23. Thus, advantageously, a total of six supporting balls are enabled to contribute in the support and in the regenerative gas drive for the rotating member 10.

From the foregoing, it will be understood that the mechanical-pneumatical suspension and reference systems embodying the present invention, as described above, are well suited to provide the advantages set forth, and since many possible embodiments may be made of the various features of this invention and as the apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

I claim:

1. A suspension system comprising a plurality of cups each having a substantially identical hemispherical socket therein, the axes of said sockets being inclined inwardly toward a common center, a plurality of identical, spherical supporting balls, each of said sockets having one spherical supporting ball therein with its surface adapted to be in close conformity with but spaced slightly away from the socket, each of said cups having passage means communicating with the space between ball and socket, a round rotatable supported member in rolling engagement with said supporting balls and having a diameter larger than the diameter of said supporting balls, and gas supply means adapted to supply a gaseous medium to said passage means.

2. A suspension system comprising a plurality of cups each having a substantially hemispherical socket therein, the size of each of said sockets being the same, the axes of said sockets being inclined inwardly toward a common center, a plurality of identical, spherical supporting balls, each of said sockets having one of said spherical supporting balls therein with the supporting ball in close conformity with but spaced slightly away from the socket, the depth of each socket being slightly less than one-half the diameter of the supporting ball therein, each of said cups having passage means communicating with the space between ball and socket, a round rotatable supported member in rolling engagement with said supporting balls and having a diameter larger than the diameter of said supporting balls, and gas supply means adapted to supply a gaseous medium to said passage means for creating a high velocity gas film in each socket beneath the ball therein.

3. A suspension system as claimed in claim 2 and wherein the depth of the socket is less than one-half of the diameter of the supporting ball therein by an amount in the range from 10% to 20% less.

4. A suspension system comprising a disc-like rotatable member having a large spherical hub, three identical supporting balls in rolling engagement with said spherical hub, said supporting balls being smaller than said spherical hub and providing three points of support therefor, three cups each having a substantially hemispherical socket therein, the axes of said sockets converging toward the center of said spherical hub, each of said supporting balls resting in one of said sockets and closely conforming therewith, passage means communicating with the space in each socket between the socket and ball, and a source of a gaseous medium under pressure connected to said passage means for providing a high-velocity gas film in each socket between ball and socket.

5. A suspension system comprising a disc-like rotatable member having a large spherical hub, three identical supporting balls in rolling engagement with said spherical hub at three points on one side of said disc-like member, said supporting balls being smaller than said spherical hub and providing three points of support therefor, three cups each defining a substantially hemispherical socket therein, at least one additional supporting ball in rolling engagement with said spherical hub on the opposite side of said disc-like member from said three supporting balls, at least one additional cup defining a substantially hemispherical socket on the opposite side of said disc-like member from said three supporting balls, the axes of said sockets converging toward the center of said spherical hub, each of said supporting balls resting in one of said sockets and closely conforming therewith, passage means communicating with the space in each socket between the socket and ball, and a source of a gaseous medium under pressure connected to said passage means for providing a high-velocity gas film in each socket between ball and socket.

6. A suspension system as claimed in claim 5 and including six supporting balls, three on each side of said disc-like members, and means providing an individual socket for each of said six balls.

7. A suspension system comprising a plurality of identical substantially hemispherical sockets, the axes of said sockets being inclined inwardly toward a common center, a plurality of identical, spherical supporting balls, each of said sockets having one spherical supporting ball therein with its surface adapted to be in close conformity with but spaced slightly away from the socket, each of said sockets having passage means communicating with the space between ball and socket, a round rotatable supported member in rolling engagement with said supporting balls, a housing surrounding said sockets, and gas supply means adapted to supply a gaseous medium to said passage means and to withdraw the gaseous medium from said housing, for maintaining a substantially constant amount of the gaseous medium in said housing during operation.

8. A suspension system as claimed in claim 7 and including an outer housing surrounding said rotatable member, and a helium atmosphere in said outer housing for reducing the frictional drag on said rotatable member.

9. A reference system including a rotatable member having a hub portion with a spherical surface area and a rim encircling said hub portion and connected thereto, said rim having an outer surface which is spherical and is concentric with the spherical surface area of the hub, a pair of electrodes having concave spherically shaped surfaces closely adjacent to the spherical outer surface of said rim and concentric therewith, said electrodes being positioned on diametrically opposite sides of said rotatable member, three identical supporting balls, said supporting balls having a radius less than the radius of the spherical area of said hub portion, said supporting balls being in rolling engagement with the spherical area of the hub portion at three points providing support for said supporting balls, three cups each having a substantially hemispherical socket therein, the axes of said sockets converging toward the center of the spherical area of said hub portion, each of said supporting balls resting in one of said sockets and closely conforming therewith, passage means communicating with the space in each socket between the socket and ball, and a source of a gaseous medium under pressure connected to said passage means for providing a high-velocity gas film in each socket between ball and socket.

10. A reference system as claimed in claim 9 and wherein said rim has an edge encircling said hub portion and defining one limit of the outer spherical surface of the rim, said edge being aligned with the center of each of said electrodes when said rotatable member is in its normal operating position.

11. A suspension system comprising a disc-like rotatable member having a large spherical hub, three identical supporting balls in rolling engagement with said spherical hub, said supporting balls being smaller than said spherical hub and providing three points of support therefor, means defining three identical substantially hemispherical sockets, the axes of said sockets converging toward the center of said spherical hub, each of said supporting balls resting in one of said sockets and closely conforming therewith, passage means communicating with the space in each socket between the socket and ball, and a source of a gaseous medium under pressure connected to said passage means for providing a high-velocity gas film in each socket between ball and socket, said gaseous medium being inert with respect to said sockets and balls and being selected from the group consisting of polyatomic gases and large molecular weight gases.

12. A suspension system as claimed in claim 11 and wherein said gaseous medium is a gas selected from the group consisting of nitrogen, carbon monoxide, carbon dioxide, krypton, and xenon.

13. A suspension system comprising a plurality of cups each having a substantially identical hemispherical socket therein, the axes of said sockets being inclined inwardly toward a common center, a plurality of identical, spherical supporting balls, each of said sockets having one spherical supporting ball therein with its surface adapted to be in close conformity with but spaced slightly away from the socket, each of said cups having a central passage communicating with the center of the space between ball and socket, a round rotatable supported member in rolling engagement with said supporting balls and having a diameter larger than the diameter of said supporting balls, and gas supply means adapted to supply a gaseous medium to said passage.

14. A suspension system as claimed in claim 13 including a plurality of adjustable pressure-reducing valves, each of said valves being associated with a respective one of said passages for individually adjusting the pressure of the high-velocity gas film in the respective sockets, and a source of high pressure gas feeding each of said pressure-reducing valves.

15. A suspension system comprising means providing three identical spherical sockets each having a sharp lip extending therearound, three identical balls each having a radius substantially identical with said sockets, each of said balls being in one of said sockets with more than one-half of the surface area of the ball extending outside of the socket and the remainder of the surface of the ball closely adjacent to the surface of the socket, the axes of said sockets converging upwardly to a common point, a rotatable member having a spherical hub of larger diameter than said balls in rolling engagement with said balls, the center of said spherical hub being close to said common point, each of said sockets having passage means communicating with the space between socket and ball, three adjustable pressure-reducing valves, one for each of said passage means, and a source of a gaseous medium under pressures substantially in excess of atmospheric pressure connected to said passage means for providing a high-velocity gas film in each socket beneath the ball.

16. A suspension system as claimed in claim 15 and wherein said sockets are positioned 120° apart around a vertical line through said common point and the axes of said sockets are each inclined at an angle to the vertical in the range from 40° to 48°.

17. A Shuler-tuned reference system comprising a normally horizontal disc-like rotatable member having a large spherical hub, the center of distributed mass of said member being in vertical alignment with the center of said spherical hub and being displaced slightly from the center of said spherical hub, three identical supporting balls in rolling engagement with said spherical hub, said supporting balls being smaller than said spherical hub and supporting said disc-like member, three sockets having their axes converging upwardly to a common point near the center of said spherical hub, each of said balls closely fitting in a respective one of said sockets, passage means communicating with the space in each socket beneath the ball, and a source of gaseous medium under pressure connected to said passage means for providing a high velocity gas film in each socket beneath the ball, the displacement of said center of distributed mass from the center of the spherical hub providing a natural oscillation period of 84.7 minutes at a rotational spin speed of said disc-like member in the range from 4,000 to 10,000 r.p.m.

18. A Shuler-tuned reference system as claimed in claim 17 and wherein the center of distributed mass is just slightly below the center of the spherical hub.

19. A Shuler-tuned reference system as claimed in claim 17 and wherein at least one additional supporting ball is in rolling engagement with said spherical hub at a point in elevation above the center of said hub.

20. A suspension system comprising a plurality of substantially hemispherical sockets, the axes of said sockets being inclined inwardly toward a common center, a plurality of spherical supporting balls, each of said sockets having one spherical supporting ball therein with its surface adapted to be in close conformity with but spaced slightly away from the socket, each of said sockets having passage means communicating with the space between ball and socket, a round rotatable supported member in rolling engagement with said supporting balls, gas supply means adapted to supply a gaseous medium to said passage means for creating a rapidly moving gas film between each supporting ball and its socket, and at least one additional substantially hemispherical socket above said supported member having one spherical ball therein with its surface adapted to be in close conformity with but spaced slightly from said latter socket, said latter ball being in rolling engagement with said supported member, said latter socket having passage means communicating with the space between said latter ball and socket, said gas supply means being adapted to supply said latter passage means for creating a rapidly moving gas film between said latter ball and socket.

References Cited in the file of this patent
UNITED STATES PATENTS
2,644,727   Tauscher et al. _____ July 7, 1953